June 30, 1953     T. ABERG     2,643,654

HYPODERMIC SYRINGE

Filed May 2, 1951

Thorsten Aberg, Inventor

By Michael S. Striker

Patented June 30, 1953

2,643,654

UNITED STATES PATENT OFFICE 2,643,654

HYPODERMIC SYRINGE

Thorsten Åberg, Goteborg, Sweden

Application May 2, 1951, Serial No. 224,187
In Sweden August 11, 1949

1 Claim. (Cl. 128—218)

The present invention relates to hypodermic syringes and more particularly to that kind of syringe which is adapted to be loaded with an ampule, the ends of which are fitted with rubber stoppers, and which is capable of being emptied of its contents through a needle inserted in one of the stoppers upon pressure being applied to the other stopper by means of a plunger, arranged inside the syringe.

The object of the invention is to provide an improved syringe of the type described and accordingly in a convenient form of the invention the end of the plunger stem, which bears against the rubber stopper, is fitted with two sharply pointed, diametrically opposing gripper claws, shaped in the form of a cylindrical screw of approximately a quarter turn which, by a slight twist of the plunger, can be made to penetrate into the rubber stopper and engage it in such a way that said stopper is not only pressed into the ampule, but can also be withdrawn within the same, and thus produce a suction or aspiration effect at the time of the injection.

The invention is illustrated by way of example in the attached drawing in which.

Figure 1:
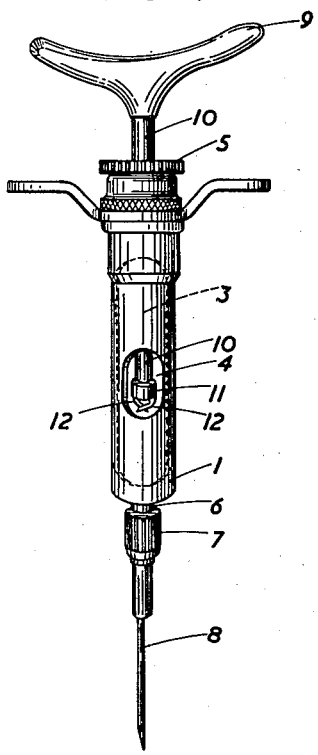
Figure 1 shows a side view of the syringe in perspective.
Figure 2:
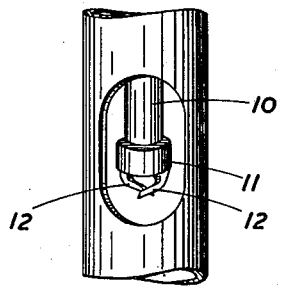
Figure 2 is a portion of the syringe on an enlarged scale.
Figure 3:
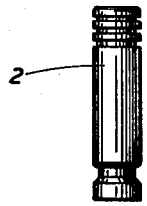
Figure 3 shows an ampule.

In a convenient form of a syringe as illustrated a cylindrical shell 1 is provided with an ampule loading aperture 3 which is indicated by dotted lines and is located on the rear side of the shell, and also an oval-shaped opening 4, arranged to facilitate the extraction of an emptied ampule. The syringe is fitted with a locking plunger 5 for holding an ampule 2 in position within the cylinder which, in its lower end, is provided with a needle holder 6 and a gude member 7 for the accommodation of the needle 8.

The plunger stem 10, fitted with the operating handle 9, is adapted to slide within the locking plunger 5, and is provided with a collar 11 which, upon injection, bears against the upper rubber stopper of the ampule. This collar 11 is fitted with two sharply pointed, diametrically opposing gripper claws 12 which, shaped in the form of a cylindrical screw of approximately a quarter turn, will, by a slight twist of the plunger, positively engage the rubber stopper so that the latter can be drawn back with a tractive as distinct from a propulsive effect and thus produce suction within the ampule.

After insertion into the syringe through the aperture 3, the ampule 2 is locked in position by the locking plunger 5 which is screwed tight against the upper portion of the ampule. The needle 8 is then pressed into the rubber stopper in the lower end of the ampule and fixed in position by means of the guide member 7. The plunger stem 10, with its gripper claws 12, is now pressed against the upper rubber stopper and given a quarter turn which causes claws 12 to penetrate and engage said stopper, upon which the latter can be both depressed into the ampule and additionally be withdrawn from such position within the same.

I claim:

A hypodermic syringe which can be loaded with an ampule, the ends of which are closed off by rubber stoppers and which is capable of being emptied of its contents through a needle inserted in one of the stoppers upon the application of pressure on the other stopper by means of a plunger, fitted within the syringe, which plunger at that end bearing against the upper rubber stopper, is provided with two sharply pointed, diametrically opposing gripper claws shaped in the form of a cylindrical screw of approximately a quarter turn which, upon turning the plunger, are adapted to penetrate into and engage said rubber stopper so that the latter not only may be depressed into the ampule but can also be withdrawn thus producing a suction effect at the time of the injection.

THORSTEN ÅBERG.

References Cited in the file of this patent

UNITED STATES PATENTS

| Number | Name | Date |
|---|---|---|
| 2,555,878 | Drabichi | June 5, 1951 |
| 2,568,173 | Spivack | Sept. 18, 1951 |

FOREIGN PATENTS

| Number | Country | Date |
|---|---|---|
| 61,467 | Germany | Mar. 9, 1892 |